(12) United States Patent  (10) Patent No.: US 9,404,775 B2
Mylaraswamy  (45) Date of Patent: Aug. 2, 2016

(54) SYSTEMS AND METHODS FOR IDENTIFYING FAULTY SENSORS

(75) Inventor: Dinkar Mylaraswamy, Fridley, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 682 days.

(21) Appl. No.: 12/112,849

(22) Filed: Apr. 30, 2008

(65) Prior Publication Data

US 2009/0276184 A1  Nov. 5, 2009

(51) Int. Cl.
*G06F 3/02* (2006.01)
*G06F 3/01* (2006.01)
*G06F 3/00* (2006.01)
*G06F 3/038* (2013.01)
*G01D 18/00* (2006.01)

(52) U.S. Cl.
CPC ...................................... *G01D 18/00* (2013.01)

(58) Field of Classification Search
CPC ....................................................... G06F 15/00
USPC ............. 702/19, 23, 100, 127, 178, 181–183, 702/185, 188; 324/522; 700/19, 21
See application file for complete search history.

(56) References Cited

U.S. PATENT DOCUMENTS

| | | |
|---|---|---|
| 5,122,976 A | 6/1992 | Bellows et al. |
| 5,386,373 A | 1/1995 | Keeler et al. |
| 5,402,333 A | 3/1995 | Cardner |
| 5,570,300 A | 10/1996 | Henry et al. |
| 5,680,409 A | 10/1997 | Qin et al. |
| 5,761,625 A | 6/1998 | Honcik et al. |
| 5,774,378 A | 6/1998 | Yang |
| 5,864,773 A | 1/1999 | Barna et al. |
| 5,910,765 A | 6/1999 | Slemon et al. |
| 6,115,656 A | 9/2000 | Sudolsky |

(Continued)

FOREIGN PATENT DOCUMENTS

| | | |
|---|---|---|
| EP | 1443375 A1 | 8/2004 |
| WO | 0169329 A2 | 9/2001 |
| WO | 0235185 A2 | 5/2002 |

OTHER PUBLICATIONS

EP Examination Report for Application No. EP 09 152 871.1 dated Nov. 17, 2014.

(Continued)

*Primary Examiner* — Gregory J Toatley
*Assistant Examiner* — Felix Suarez
(74) *Attorney, Agent, or Firm* — Ingrassia Fisher & Lorenz, P.C.

(57) ABSTRACT

Systems and methods for identifying a faulty sensor are provided. One system includes multiple sensors, each generating a first set of parameters based on detected measurands. The system also includes a fusion module for generating a second set of parameters by fusing the first sets of parameters, and a sensor fault module including multiple fault templates defining sensor faults, an estimation module for generating a third set of parameters based on the first and second sets of parameters, and an evaluation module. The evaluation module is configured to compare the third set of parameters and the fault templates, and determine a sensor fault based on the comparison. A method includes receiving a first set of parameters based on measurands from multiple sensors and a second set of parameters based on a measurand from a sensor, and determining a sensor fault based on the first and second set of parameters.

12 Claims, 3 Drawing Sheets

(56) References Cited

U.S. PATENT DOCUMENTS

| | | | |
|---|---|---|---|
| 6,295,488 B1 | 9/2001 | Longere | |
| 6,434,512 B1 | 8/2002 | Discenzo | |
| 6,502,042 B1 * | 12/2002 | Eid et al. | 702/50 |
| 6,606,580 B1 * | 8/2003 | Zedda et al. | 702/185 |
| 6,766,230 B1 | 7/2004 | Rizzoni et al. | |
| 6,892,163 B1 * | 5/2005 | Herzog et al. | 702/181 |
| 6,915,237 B2 | 7/2005 | Hashemian | |
| 6,985,779 B2 * | 1/2006 | Hsiung et al. | 700/19 |
| 7,096,159 B2 | 8/2006 | Cataltepe et al. | |
| 7,099,796 B2 | 8/2006 | Hamza | |
| 7,103,507 B2 | 9/2006 | Gorinevsky et al. | |
| 7,107,176 B2 | 9/2006 | Henry et al. | |
| 7,149,612 B2 | 12/2006 | Stefani et al. | |
| 7,233,886 B2 | 6/2007 | Wegerich et al. | |
| 7,248,984 B2 | 7/2007 | Hadley | |
| 7,251,582 B2 * | 7/2007 | Singh et al. | 702/183 |
| 7,282,921 B2 * | 10/2007 | Sela et al. | 324/522 |
| 7,421,351 B2 * | 9/2008 | Navratil | 702/58 |
| 7,542,825 B2 * | 6/2009 | Kawasaki | 701/1 |
| 2002/0042694 A1 * | 4/2002 | Henry et al. | 702/188 |

OTHER PUBLICATIONS

EP Communication for Application No. 09 152 871.1-1568 dated Dec. 1, 2016.

EP Exam Report for Application No. EP 09 152 871.1 dated Apr. 10, 2014.

EP Search Report for Application No. EP 09 152 871.1 dated Sep. 24, 2013.

* cited by examiner

SYSTEMS AND METHODS FOR IDENTIFYING FAULTY SENSORS

STATEMENT REGARDING FEDERALLY SPONSORED RESEARCH OR DEVELOPMENT

The United States Government has a paid-up license in this invention and the right in limited circumstances to require the patent owner to license others on reasonable terms as provided by the terms of Contract No. W911NF-06-3-0001 awarded by the United States Army Research Lab.

FIELD OF THE INVENTION

The present invention generally relates to sensors, and more particularly relates to systems and methods for identifying faulty sensors.

BACKGROUND OF THE INVENTION

Sensors are used in many applications including, for example, systems for detecting/sensing changes temperature, motion, light, sound, seismic activity, pressure, humidity, and/or other similar measurands or physical phenomenon. As such, sensors are typically configured to detect measurands within a predetermined range. For example, particular temperature sensors may be configured to detect temperatures in the range of 0°-100° C. When these sensors detect a measurand beyond their predetermined range (i.e., a temperature less than 0° C. or greater than 100° C. in this example), the sensors are considered to be saturated or "out of range" either because they are actually detecting a measurand quantity outside of the predetermined range, or the sensors are malfunctioning. While non-sophisticated sensors typically do not send a saturation error signal, some sophisticated sensors are capable of transmitting a saturation error signal. While transmitting a saturated error signal may be useful in identifying malfunctioning sensors so that their faulty readings may be ignored or the sensors may be fixed or replaced, sensors can malfunction for one or more reasons other than and/or in addition to a saturation error.

Accordingly, it is desirable to provide systems and methods for identifying one or more malfunctioning sensors so that their faulty readings may be ignored or the sensor(s) may be fixed or replaced. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Sensor fault modules for identifying a faulty sensor are provided. One sensor fault module is configured to be coupled to a fusion module for generating a first set of parameters based on a plurality of detected measurands received from a plurality of sensors, and configured to be coupled to a sensor of the plurality of sensors for generating a second plurality of parameters based on a detected measurand. The sensor fault module comprises a fault template module configured to store a set of fault templates indicative of a plurality of faults for the sensor, an estimation module configured to generate a third set of parameters representing an estimated measurand for the sensor based on the first set of parameters and the second set of parameters, and an evaluation module coupled to the fault template module and the estimation module. The evaluation module is configured to compare the third set of parameters and the set of fault templates, and determine one of the plurality of faults for the sensor based on the comparison.

Various embodiments also provide a method for identifying a faulty sensor. One method comprises the steps of receiving a first set of parameters representing a plurality of measurands detected by a plurality of sensors, receiving a second set of parameters representing one of the plurality measurands detected by one of the plurality of sensors, and determining a sensor fault of a plurality of sensor faults for the one of the plurality of sensors based on the first and second sets of parameters.

Systems for identifying a faulty sensor are also provided. One system comprises a plurality of sensors configured to generate a first set of parameters representing a detected measurand and a fusion module coupled to the plurality of sensors and configured to generate a second set of parameters by fusing the first sets of parameters. The system further comprises a plurality of sensor fault modules, each sensor fault module coupled to one of the plurality of sensors and the fusion module. Each sensor fault module comprises a fault template module configured to store a set of fault templates indicative of a plurality of faults for the plurality of sensors, an estimation module configured to generate a third set of parameters representing an estimated measurand for a sensor of the plurality of sensors based on the first and second sets of parameters, and an evaluation module coupled to the fault template module and the estimation module. The evaluation module is configured to compare the third set of parameters and the set of fault templates, and determine one of the plurality of faults for the sensor based on the comparison.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments provide systems and methods for identifying and isolating one or more faulty sensors. Systems and methods for identifying and isolating one or more sensors malfunctioning for one or more reasons other than and/or in addition to a saturation error are also provided.

Figure 1:
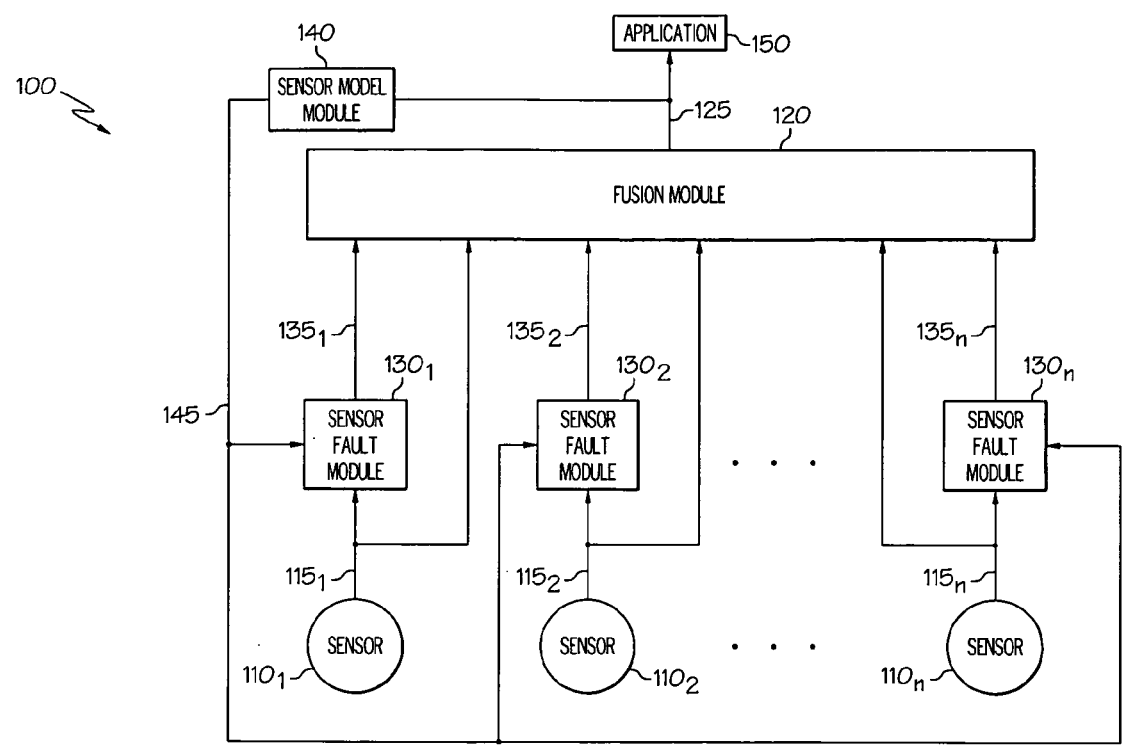
FIG. 1 is a schematic diagram of one embodiment of a sensor system.

FIG. 1 is a schematic diagram of one embodiment of a sensor system 100. At least in the illustrated embodiment, sensor system 100 comprises a plurality of sensors 110 (e.g., sensor $110_1$, sensor $110_2$, ... and sensor $110_n$) coupled to a fusion module 120 and to an associated sensor fault module 130 (e.g., sensor fault module $130_1$, sensor fault module $130_2$, ... and sensor fault module $130_n$ respectively), wherein each sensor fault module 130 is further coupled to fusion module 120, and fusion module 120 is further coupled to a sensor model module 140 and an application 150.

Sensors 110 may be any system and/or device capable of detecting a measurand and/or detecting changes in a measurand and generating a set of parameters representing the measurand. That is, each sensor 110 may be any system or device capable of detecting (including changes in), for example, temperature, motion, light, sound, seismic activity, pressure, humidity, and/or other similar measurands or physical phenomenon. Once a measurand is detected, each sensor 110 is configured to transmit a signal 115 containing the set of parameters to fusion module 120.

Fusion module 120 may be any system, device, hardware/software, and combinations thereof capable of fusing the sets of parameters contained within signals $115_1$, $115_2$, ... and $115_n$ received from sensors $110_1$, $110_2$, ... and $110_n$, respectively, to generate a signal 125 indicative of a physical phenomenon, discriminating between signals 115 from properly functioning and malfunctioning sensors 110, analyzing the fused sets of parameters, and determining the presence of and/or a change in the physical phenomenon based on the analysis. In one embodiment, fusion module 120 is configured to receive signals $115_1$-$115_n$ from sensors $110_1$-$110_n$ and signals $135_1$-$135_n$ (discussed below) from sensor fault modules $130_1$-$130_n$, identify signal(s) 115 from faulty sensors 110 based on signals $135_1$-$135_n$, fuse signals 115 from properly functioning sensors 110 to generate a signal 125 (which is transmitted to sensor model module 140 and application 150), analyze the fused sets of parameters, and determine if a physical phenomenon has occurred/changed based on the analysis. In receiving signals 135 from each sensor fault module 130, if a signal 135 indicates that the sensor 110 is malfunctioning, fusion module 120 is configured to exclude the parameters in the signal 115 from the malfunctioning sensor 110 in generating the fused sets of parameters (i.e., in determining the occurrence of or change in the physical phenomenon) contained within signal 125.

For example, fusion module 120 is configured to determine the fuel level in a fuel tank based on the sets of parameters received from sensors $110_1$-$110_n$ (via signals $115_1$-$115_n$). If signal 1352 received from sensor fault module $130_2$ indicates that sensor $110_2$ is malfunctioning, fusion module 120 is configured to isolate or ignore the parameters (i.e., measurands) contained within signal $115_2$ when determining the fuel level. That is, fusion module 120 is configured to determine the fuel level of the tank based on the measurands received from sensor $110_1$ and any other sensor 110 that is functioning properly in sensor system 100.

Various embodiments of fusion module 120 may fuse the sets of parameters within signals $115_1$-$115_n$ in accordance with known data fusion techniques. In one embodiment, fusion module 120 is configured to fuse signals $115_1$-$115_n$ by averaging the measurand parameters in signals $115_1$-$115_n$ to generate signal 125. In this embodiment, weights given to individual signals 115 depend on the reliability of the sensor 110 that generated the signal 115 (weighted averages) or isolation of a sensor 110 based on the signal 135 from its associated sensor fault module 130.

In another embodiment, fusion module 120 is configured to fuse signals $115_1$-$115_n$ using a "hidden variable" technique to generate signal 125. In this embodiment, the event of interest (or physical phenomenon) is formulated as a variable embedded in a low-parameter space of dimension, M<<N. A correlation model (e.g., similar principal components, neural network, fuzzy logic, etc.) may be used to identify this low dimension space and define a mapping between the "E" and the "y" space.

Fusion module 120, in yet another embodiment, is configured to fuse signals $115_1$-$115_n$ using a "hidden state" technique to generate signal 125. In this embodiment, the event of interest is formulated as a hidden variable evolving in a lower dimension state space where signals $115_1$-$115_n$ provide a noisy realization for the state. A dynamic model (e.g., hidden Markov, auto regressive, etc.) may used to identify the state space, and a filtering scheme (e.g., a Kalman filter, a particle filter, etc.) may be used to estimate the hidden state recursively using signals $115_1$-$115_n$.

Signal 125 is transmitted to sensor model module 140 and application 150 for display to a user), wherein sensor model module 140 is configured to generate a signal 145 representing the ideal value for each parameter in the set of parameters in signals $115_1$-$115_n$ based on the physical phenomenon determined by fusion module 120. That is, because sensors $110_1$-$110_n$ are the same type of sensor 110, sensor fault modules $130_1$-$130_n$ will receive the same signal 145 containing the ideal parameter values for the particular sensor type of sensors $110_1$-$110_n$.

Each sensor fault module 130 may be any system and/or device capable of receiving signal 115 from its associated sensor 110 and signal 145 from sensor model module 140, and using data contained within signals 115 and 145 to determine if its associated sensor 110 is malfunctioning. Each sensor fault module 130 is further configured to transmit a signal 135 to fusion module 120 indicating whether its associated sensor 110 is malfunctioning, and if malfunctioning, the type of malfunction the associated sensor 110 is experiencing.

Of note, signals $115_1$-$115_n$ and signal 145, in one embodiment, include parameters that may be described using the following first order linear model:

$$x(t+1)=Ax(t)+Bu(t)+v(t)$$

$$y(t)=Cx(t)+\epsilon(t)$$

$$0 \leq t \leq T, x(0)=x_0, u(t)=1 \forall t, \quad (1)$$

Qualitatively, equation (1) may be described as follows: over a time window, T, a particular sensor 110 responds to changes in a measurand, x, as a linear dynamic model. That is, the dynamics of the sensor's transducer response model is determined by "A," while $v \sim N(0, Q)$ indicates the noise introduced in the transducer. Bias, B, is introduced into sensor 110 when B does not equal zero, and sensor 110 is not biased when B is equal to zero. Furthermore, "C" represents the calibration or the gain factor in sensor 110, while $\epsilon \sim N(0, R)$ signifies the noise introduced by the electronics included within sensor 110. That is, signal 145 includes the ideal value for parameters A, B, C, Q, and R that are indicative of the physical phenomenon being determined by sensor system 100 based on the fusion of the sets of parameters A, B, C, Q, and R contained within signals $115_1$-$115_n$ transmitted by sensors $110_1$-$110_n$, respectively.

Figure 2:
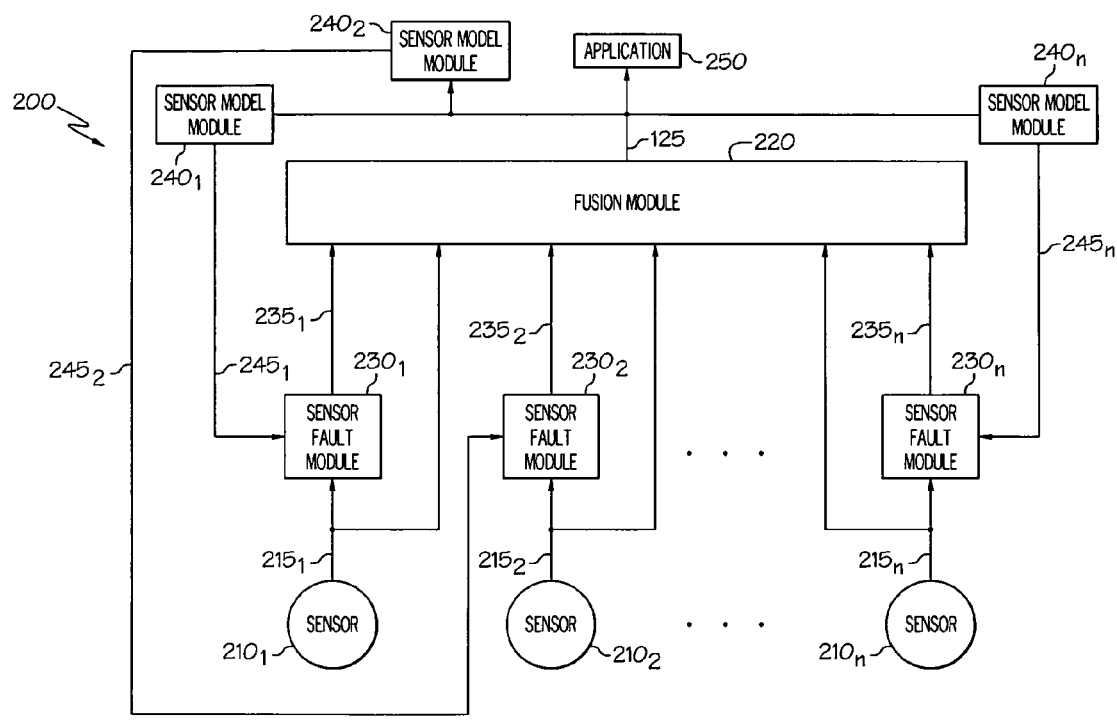
FIG. 2 is a schematic diagram of an embodiment of a sensor system including multiple sensor types.

FIG. 2 is a schematic diagram of one embodiment of a sensor system 200 including a plurality of different sensors 210. Each different sensor 210 may represent multiple sensors 210 of a particular type similar to the embodiments discussed above with reference to FIG. 1. That is, each sensor 210 may represent sensors $110_1$-$110_n$ such that sensor system 200 includes multiple sensors 210 of multiple sensor types.

At least in the illustrated embodiment, sensor system 200 comprises a plurality of different sensors 210 (e.g., sensor $210_1$, sensor $210_2$, ... and sensor $210_n$) coupled to a fusion module 220 and to an associated sensor fault module 230 (e.g., sensor fault module $230_1$, sensor fault module $230_2$, ... and sensor fault module $230_n$, respectively), wherein each sensor fault module 230 is further coupled to fusion module 220, and fusion module 220 is further coupled to a sensor model module 240 and an application 250. Each sensor 210 may be any system and/or device capable of detecting a measurand and/or detecting changes in a measurand and generating a set of parameters representing the measurand. That is, each sensor 210 is a different type of system or device capable of detecting (including changes in), for example, temperature, motion, light, sound, seismic activity, pressure, humidity, and/or other similar measurand or physical phenomenon. Once a measurand is detected, each sensor 210 is configured to transmit a signal 215 containing the set of parameters to fusion module 220.

Fusion module 220 may be any system, device, hardware/software, and combinations thereof capable of fusing the sets of parameters contained within signals $215_1$, $215_2$, ... and $215_n$ received from sensors $210_1$, $210_2$, ... and $210_n$, respectively, to generate a signal 225 indicative of a physical phenomenon, discriminating between signals 215 from properly functioning and malfunctioning sensors 210, analyzing the fused sets of parameters, and determining the presence of and/or a change in the physical phenomenon based on the analysis. In one embodiment, fusion module 220 is configured to receive signals $215_1$-$215_n$ from sensors $210_1$-$210_n$ and signals $235_1$-$235_n$ (discussed below) from sensor fault modules $230_1$-$230_n$, identify signal(s) 215 from faulty sensors 210 based on signals $235_1$-$235_n$, fuse signals 215 from properly functioning sensors 210 to generate a signal 225 (which is transmitted to sensor model module 240 and application 250), analyze the fused sets of parameters, and determine if a physical phenomenon has occurred/changed based on the analysis. In receiving signals 235 from each sensor fault module 230, if a signal 235 indicates that the sensor 210 is malfunctioning, fusion module 220 is configured to exclude the parameters in the signal 215 from the malfunctioning sensor 210 in generating the fused sets of parameters (i.e., in determining the occurrence of or change in the physical phenomenon) contained within signal 225.

Various embodiments of fusion module 220 may fuse the sets of parameters within signals $215_1$-$215_n$ in accordance with known data fusion techniques. In one embodiment, fusion module 220 is configured to fuse signals $215_1$-$215_n$ by averaging the measurand parameters in signals $215_1$-$215_n$ to generate signal 225. In this embodiment, weights given to individual signals 215 depend on the reliability of the sensor 210 that generated the signal 215 (weighted averages) or isolation of a sensor 210 based on the signal 235 from its associated sensor fault module 230.

In another embodiment, fusion module 220 is configured to fuse signals $215_1$-$215_n$ using a "hidden variable" technique to generate signal 225. In this embodiment, the event of interest (or physical phenomenon) is formulated as a variable embedded in a low-parameter space of dimension, M<<N. A correlation model (e.g., similar principal components, neural network, fuzzy logic, etc.) may be used to identify this low dimension space and define a mapping between the "E" and the "y" space.

Fusion module 220, in yet another embodiment, is configured to fuse signals $215_1$-$215_n$ using a "hidden state" technique to generate signal 225. In this embodiment, the event of interest is formulated as a hidden variable evolving in a lower dimension state space where signals $215_1$-$215_n$ provide a noisy realization for the state. A dynamic model (e.g., hidden Markov, auto regressive, etc.) may used to identify the state space, and a filtering scheme (e.g., a Kalman filter, a particle filter, etc.) may be used to estimate the hidden state recursively using signals $215_1$-$215_n$.

Signal 225 is transmitted to sensor model modules 240 and application 250 for display to a user, wherein sensor model modules 240 are each configured to generate a signal 245 representing the ideal value for each parameter in the set of parameters in signals $215_1$-$215_n$ based on the type of sensor 210 associated with each particular sensor model module 240. That is, sensor model modules $240_1$, $240_2$, ... and $240_n$ are each configured to generate a signal $245_1$, $245_2$, ... and $2450_n$ respectively, for the particular sensor type of sensor for associated sensors $210_1$, $210_2$, ... and $210_n$. In other words, because sensors $210_1$-$210_n$ are different types of sensors 210, the ideal values for each set of parameters for sensors $210_1$-$210_n$ will be different, and thus signals $245_1$, $245_2$, ... and $245_n$ will contain the corresponding ideal parameter values for its associated one of sensors $210_1$-$210_n$.

Each sensor fault module 230 may be any system and/or device capable of receiving signal 215 from its associated sensor 210 and the signal 245 for its associated sensor 210 from the corresponding sensor model module 240, and using data contained within signals 215 and 245 to determine if the particular sensor 210 is malfunctioning. Each sensor fault module 230 is further configured to transmit a signal 235 to fusion module 220 indicating whether its associated sensor 210 is malfunctioning, and if malfunctioning, the type of malfunction the associated sensor 210 is experiencing.

Of note, signals $215_1$-$215_n$ and signals $245_1$-$245_n$, in one embodiment, include parameters that may be described using the following first order linear model:

$$x(t+1)=Ax(t)+Bu(t)+v(t)$$

$$y(t)=Cx(t)+\epsilon(t)$$

$$0 \le t \le T, x(0)=x_0, u(t)=1 \forall t, \quad (1)$$

Qualitatively, equation (1) may be described as follows: over a time window, T, a particular sensor 210 responds to changes in a measurand, x, as a linear dynamic model. That is, the dynamics of the sensor's transducer response model is determined by "A," while $v \sim N(0, Q)$ indicates the noise introduced in the transducer. Bias, B, is introduced into sensor 210 when B does not equal zero, and sensor 210 is not biased when B is equal to zero. Furthermore, "C" represents the calibration or the gain factor in sensor 210, while $\epsilon \sim N(0, R)$ signifies the noise introduced by the electronics included within sensor 210. That is, signals $245_1$-$245_n$ include the ideal value for parameters A, B, C, Q, and R that are indicative of the physical phenomenon being determined by sensor system 200 based on the fusion of the sets of parameters A, B, C, Q, and R contained within signals $215_1$-$215_n$ transmitted by sensors $210_1$-$210_n$, respectively.

Figure 3:
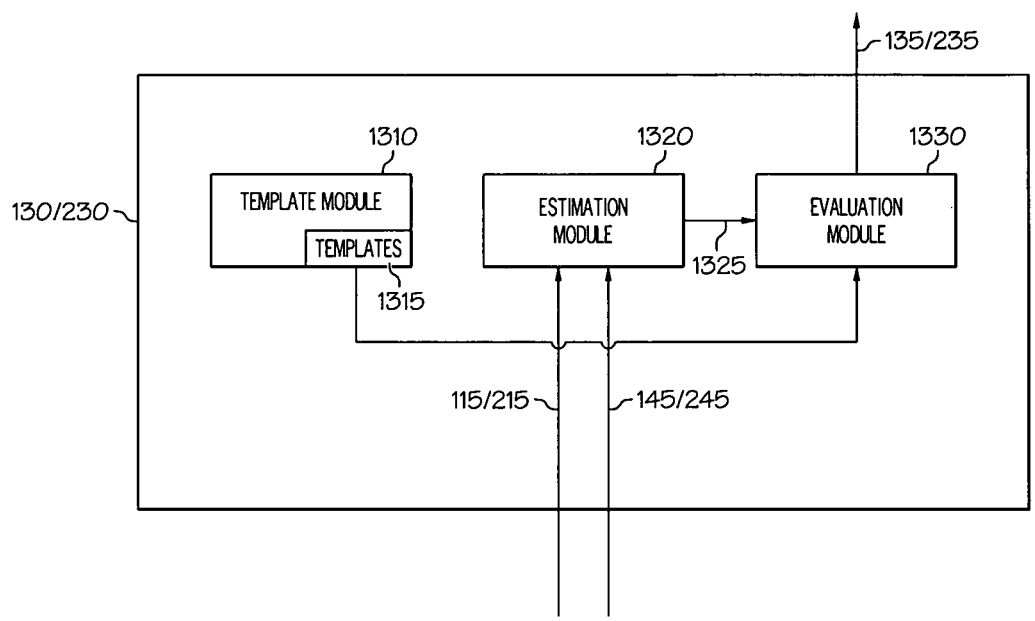
FIG. 3 is a schematic diagram of an embodiment of a sensor fault module included within the sensor systems of FIGS. 1 and 2.

FIG. 3 is a schematic diagram of one embodiment of a sensor fault module (e.g., sensor fault modules 130 and 230) included within sensor system 100 of FIG. 1 and sensor system 200 of FIG. 2. Sensor fault module 130 (or 230), at least in the illustrated embodiment, includes a template module 1310 and an estimation module 1320, each coupled to an evaluation module 1330.

Template module 1310 may be any system, device, hardware, software, and combinations thereof capable of storing one or more templates 1315 indicative of the state of health (e.g., functioning normally or malfunctioning) of a sensor 110. In one embodiment, templates 1315 define a normal state, a noisy state, a frozen state, a saturation state, a bias state, an oscillating state, a spiking state, and/or an unknown state. Specifically, a normal or properly functioning sensor 110 will have values for parameters A, B, C, and Q that closely resemble an ideal or given set of values for the parameters (i.e., $A=A_0$, $B=0$, $C=1$, $Q=Q_0$). In addition, the noise parameter R representing the noise generated by the electronics in sensor 110 (or 210) will be between the lower and upper limits of the standard deviation, $r^l$ and $r^u$, respectively, for the noise parameter R (i.e., $r^l < R < r^u$).

A sensor 110 (or 210) is noisy when the values for parameters A, B, C, and R closely resemble the ideal or given set of values for the parameters (i.e., $A=A_0$, $B=0$, $C=1$, $R=R_0$) and the noise parameter Q is greater than the upper limit of the standard deviation, $q^u$, for the noise parameter Q (i.e., $Q > q^u$). A sensor 110 (or 210) is frozen when the values for parameters A, B, C, and R closely resemble the ideal or given set of values for the parameters (i.e., $A=A_0$, $B=0$, $C=1$, $R=R_0$) and the noise parameter Q is less than the lower limit of the standard deviation, $q^l$, for the noise parameter Q (i.e., $Q < q^l$). A sensor 110 (or 210) is saturated when the values for parameters A, B, Q, and R closely resemble the ideal or given set of values for the parameters (i.e., $A=A_0$, $B=0$, $Q=Q_0$, $R=R_0$) and the calibration parameter C is not between the lower and upper limits of the standard deviation, $c^l$ and $c^u$, respectively, for the calibration parameter C (i.e., $C \neq [c^l, c^u]$). A sensor 110 (or 210) is biased when the values for parameters A, C, Q, and R closely resemble the ideal or given set of values for the parameters (i.e., $A=A_0$, $C=1$, $Q=Q_0$, $R=R_0$) and the bias parameter B is a non-zero value (i.e., $B \neq 0$). A sensor 110 (or 210) is oscillating when the values for parameters B, C, Q, and R closely resemble the ideal or given set of values for the parameters (i.e., $B=0$, $C=1$, $Q=Q_0$, $R=R_0$) and the absolute value of the delay parameter A is larger than the upper limit of the standard deviation, $a^u$, for the delay parameter A (i.e., $|A| > a^u$), and is spiking when the absolute value is much larger than the upper limit of the standard deviation $a^u$ (i.e., $|A| \gg a^u$). A sensor 110 (or 210) is experiencing an unknown state when the values for parameters A, B, C, Q, and R do not match any of the states discussed above.

It is important to note that various embodiments of template module 1310 may include templates indicative of other states of health for sensors 110 (or 210), and/or may include a greater number of or a fewer number of health states than the number of health states discussed above. Once stored and available for use, templates 1315 may then be compared to a set of parameters representing an estimated measurand for an associated sensor 110 (or 210) generated by estimation module 1320 to determine the state of health of the particular sensor 110 (or 210).

Estimation module 1320 may be any system, device, hardware, software, and combinations thereof capable of generating a signal 1325 containing a set of parameters representing an estimated measurand for the associated sensor (e.g., sensor 110 or 210) based on a set of parameters contained in a signal (e.g., signal 115 or 215) from sensor 110 (or 210) and a set of parameters (i.e., fused sets of parameters) contained in a signal (e.g., signal 145 or 245) from a sensor model module (e.g., sensor model module 140 or 240). In one embodiment, estimation module 1320 is configured to perform a least square minimization algorithm on the sets of parameters in signals 115 and 145 to generate the set of parameters representing the estimated measurand. The least square minimization algorithm may be represented by the following equation:

$$\min \sum_{i}^{T} (y(i) - \bar{y}(i))^2 \quad (3)$$

where:

$x(t+1) = Ax(t) + Bu(t) + v(t)$ $\bar{y}(t) = Cx(t) + \varepsilon(t)$ $0 \le t \le T, x(0) = x_0, u(t) = 1 \forall t$ such that:

$$p \Leftrightarrow \{A, B, C, Q, R\} = \{p_a; p_u\},$$

where p represents the model parameters A, B, C, Q, and R, signal 115 is represented by y (i), and signal 145 is represented by $x_0$. Each fault template 1315 partitions the parameter set into $p_a$ (known parameters needing estimation) and $p_u$ (unknown parameters needing estimation). For example, a sensor 110 is saturated when the values for parameters A, B, Q, and R closely resemble the ideal or given set of values for the parameters (i.e., $A=A_0$, $B=0$, $Q=Q_0$, and $R=R_0$) and the calibration parameter C is not between the lower and upper limits of the standard deviation, $c^l$ and $c^u$, respectively, for the calibration parameter C. Consequently, the oscillation fault template 1315 includes $p_a = \{A, B, Q, R\}$ and $p_u = \{C\}$. The estimated measurand set of parameters may then be compared to the fault conditions defined in one or more of templates 1315 by evaluation module 1330 to determine if there is a match, which indicates the state of health of sensor 110.

Evaluation module 1330 may be any system, device, hardware, software, and combinations thereof capable of determining the state of health of sensor 110 based on the set of parameters for the estimated measurand in signal 1325 and one or more of templates 1315. In one embodiment, evaluation module is configured to compare the set of parameters contained within the estimated measurand to the one or more templates 1315 to determine if there is a match. That is, to determine if the parameters in the estimated measurand fall within the definitions of the various states of health defined by templates 1315. The following discussion may be helpful in understanding the operation of evaluation module 1330.

For notation purposes, let θ and FS(p) denote the health state and the health state signature, respectively, for sensor 110. Combining equation (1) with the health state signature FS(p) results in $p \Leftrightarrow \{A, B, C, Q, R\}$ and $\theta_k$, which are labeled regions in the parameter space.

In one embodiment, a sensor 110 (or 210) that has no defined fault (or a "normal" sensor 110) may indicated by a signal 115 (or 215) having a well-defined time constant, well-defined transducer noise, and no bias. Under these conditions, signal 115 may contain some amount of noise generated by the electronics in the sensor 110, which can be represented as equation (2):

$$\theta_0 : p_0 \Leftrightarrow \{\text{Given: } A=A_0, B=0, C=1, Q=Q_0; \text{Expected: } R=R_0\}. \quad (2)$$

In general, for any θ, p may be partitioned as $\{p_a; p_u\}$ where $p_a$ denotes "assumed" or given parameters and $p_u$ denotes an "unknown" or isolated parameter contained within the set of parameters for the estimated measurand, and for which there is a health state defined in a template 1315 associated with the isolated parameter. Table 1 enumerates various health states ($\theta_k$) that a sensor 110 may be experiencing based on definitions within templates 1315 corresponding to the parameters contained in the set of parameters for the estimated measurand.

TABLE 1

| Health State, $\theta_k$ | $p_a$ | $p_u$ | Template |
| --- | --- | --- | --- |
| $\theta_0$, Normal | $A = A_0, B = 0, C = 1, Q = Q_0$ | R | $r^l < R < r^u$ |
| $\theta_1$, Noisy | $A = A_0, B = 0, C = 1, R = R_0$ | Q | $Q > q^u$ |
| $\theta_2$, Frozen | $A = A_0, B = 0, C = 1, R = R_0$ | Q | $Q < q^l$ |
| $\theta_3$, Saturation | $A = A_0, B = 0, Q = Q_0, R = R_0$ | C | $C \neq [c^l, c^u]$ |

TABLE 1-continued

| Health State, $\theta_k$ | $p_a$ | $p_u$ | Template |
|---|---|---|---|
| $\theta_4$, Bias | $A = A_0, C = 1, Q = Q_0, R = R_0$ | B | $B \neq 0$ |
| $\theta_5$, Oscillation | $B = 0, C = 1, Q = Q_0, R = R_0$ | A | $|A| > a^u$ |
| $\theta_6$, Spike | $B = 0, C = 1, Q = Q_0, R = R_0$ | A | $|A| \gg a^u$ |
| $\theta^*$, Unknown | None of the Above | | |

In general, evaluation module 1330 is configured to compare the various parameters in the estimated measurand and each health state defined in a template 1315 to determine if one of the parameters satisfies one of the health states defined in templates 1315. In one embodiment, evaluation module 1330 is configured to isolate a particular parameter in the estimated measurand and compare the value contained in the isolated parameter and the corresponding health state defined in template 1315. If the condition is satisfied (i.e., there is a match), the sensor 110 is deemed to have the state of health corresponding with the template 1315 definition. If the template 1315 condition is not satisfied, evaluation module 1330 is configured to isolate another parameter and make the corresponding comparison, or compare the isolated parameter and another condition defined in another template 1315 until a state of health for the sensor 110 is determined.

Specifically, and with reference to Table 1, to determine if a sensor 110 is normal ($\theta_0$), evaluation module 1330 is configured to isolate the noise parameter R in the estimated measurand by setting $A=A_0$, $B=0$, $C=1$, and $Q=Q_0$, and then compare the noise parameter R to the condition $r^l < R < r^u$ defined in template 1315. If the noise parameter R satisfies the condition $r^l < R < r^u$, evaluation module 1330 determines that the sensor 110 is normal or functioning properly, and transmits signal 135 to fusion module 120 (see FIG. 1) indicating such. If the noise parameter R does not satisfy the condition $r^l < R < r^u$, evaluation module 1330 determines that the sensor 110 is malfunctioning and may transmit a signal 135 to fusion module 120 indicating such so that fusion module can ignore or isolate the signal 115 from the associated sensor 110 when fusing signals 115 from the other sensors 110. In addition, evaluation module 1330 may be configured to determine which malfunction or state of health the associating sensor 110 is experiencing by isolating the remaining parameters in the estimated measurand and comparing each isolated parameter to the other conditions defined in templates 1315.

For example, after determining that the associated sensor 110 is malfunctioning, evaluation module 1330 may isolate the noise parameter Q by setting $A=A_0$, $B=0$, $C=1$, and $R=R_0$, and then compare the noise parameter Q to the condition $Q > r^u$ and/or $Q < r^l$ defined in a template 1315 to determine if the sensor 110 is noisy state and/or frozen, respectively. If one of these conditions is satisfied, evaluation module 1330 may inform fusion module 120 of the malfunction associated with the satisfied condition in signal 135. If one of these conditions is not satisfied, evaluation module 1330 may continue isolating the remaining parameters in the estimated measurand until one of the states of health in Table 1 is identified. In the event that evaluation module 1330 is unable to determine a match, evaluation module 1330 is configured to determine that the sensor 110 is operating in an unknown ($\theta^*$) state of health, but is nonetheless not operating in a normal state.

As one skill in the art will appreciate, evaluation module 1330 may isolate parameters A, B, C, Q, and R and compare the isolated parameter to a corresponding definition in any order when determining the state of health of the associated sensor 110. That is, the invention is not limited to the order described above, and such order is set forth merely to enable one skilled in the art to better understand the concepts associated with the invention. Similarly, the various conditions defining the state of health of the sensor 110 have been described as being stored within templates 1315; however, one skilled in the art will appreciate that such definitions may be stored in a single template 1315 or in a plurality of templates 1315.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A sensor system comprising:
   at least one sensor device;
   a fusion module; and
   a sensor fault module, the sensor fault module further comprising:
   a fault template module configured to store a set of fault templates, each fault template indicative of one of a plurality of faults for the at least one sensor device;
   an estimation module configured to generate a third set of parameters representing an estimated measurand for the at least one sensor device based on a first set of parameters generated by the at least one sensor device and a second set of parameters generated by the fusion module; and
   an evaluation module coupled to the fault template module and to the estimation module, wherein the evaluation module is configured to:
   compare the third set of parameters and the set of fault templates, and
   determine one of the plurality of faults for the at least one sensor device based on the comparison, wherein the sensor fault module is coupled between the at least one sensor device and the fusion module.

2. The sensor fault module of claim 1, wherein the one of the plurality of faults is a noise fault characterized by a noise parameter in the third set of parameters being greater than an upper limit of a standard deviation for the noise parameter.

3. The sensor fault module of claim 1, wherein the one of the plurality of faults is a frozen fault characterized by a noise parameter in the third set of parameters being less than a lower limit of a standard deviation for the noise parameter.

4. The sensor fault module of claim 1, wherein the one of the plurality of faults is a saturation fault characterized by a calibration parameter in the estimated measurand being beyond an upper or lower limit of a predetermined range for the measurand.

5. The sensor fault module of claim 1, wherein the one of the plurality of faults is a bias fault characterized by an input parameter in the third set of parameters having a non-zero value.

6. The sensor fault module of claim 1, wherein the one of the plurality of faults is a spike fault characterized by a delay parameter in the third set of parameters having an absolute value much larger than an upper limit of a standard deviation for the delay parameter.

7. The sensor fault module of claim 1, wherein the one of the plurality of faults is an oscillation fault characterized by a delay parameter in the third set of parameters having an absolute value larger than an upper limit of a standard deviation for the delay parameter.

8. The sensor fault module of claim 1, wherein the estimation module is configured to perform a least square minimization algorithm on the first and second sets of parameters to generate the third set of parameters.

9. A sensor system for identifying a faulty sensor, comprising:
- a plurality of sensors configured to generate a first set of parameters representing a detected measurand;
- a fusion module coupled directly to the plurality of sensors and configured to generate a second set of parameters by fusing the first sets of parameters; and
- a plurality of sensor fault modules, each sensor fault module coupled to one of the plurality of sensors and to the fusion module, each sensor fault module comprising:
  - a fault template module configured to store a set of fault templates indicative of a plurality of faults for the plurality of sensors,
  - an estimation module configured to generate a third set of parameters representing an estimated measurand for a sensor of the plurality of sensors based on the first and second sets of parameters, and
  - an evaluation module coupled to the fault template module and the estimation module, wherein the evaluation module is configured to:
    - compare the third set of parameters and the set of fault templates, and
    - determine one of the plurality of faults for the sensor based on the comparison.

10. The sensor system of claim 9, wherein the one of the plurality of faults is one of:
- a noise fault characterized by a noise parameter in the third set of parameters being greater than an upper limit of a standard deviation for the noise parameter;
- a frozen fault characterized by the noise parameter being less than a lower limit of the noise parameter standard deviation;
- a saturation fault characterized by a calibration parameter in the third set of parameters being beyond the upper or lower limit of a predetermined range for the measurand;
- a bias fault characterized by an input parameter in the third set of parameters having a non-zero value;
- a spike fault characterized by a delay parameter in the third set of parameters having an absolute value much larger than an upper limit of a standard deviation for the delay parameter; and
- an oscillation fault characterized by the delay parameter absolute value being larger than an upper limit of the delay parameter standard deviation.

11. The sensor system of claim 10, wherein the fusion module is configured to isolate the first set of parameters from the sensor in generating the second set of parameters when the one of the plurality of faults is determined.

12. The sensor system of claim 9, wherein the estimation module is configured to perform a least square minimization algorithm on the first and second sets of parameters to generate the third set of parameters.

\* \* \* \* \*